United States Patent [19]

Pierret et al.

[11] Patent Number: 5,309,083
[45] Date of Patent: May 3, 1994

[54] CIRCUIT FOR GENERATING A REFERENCE VOLTAGE THAT VARIES AS A FUNCTION OF TEMPERATURE, IN PARTICULAR FOR REGULATING THE VOLTAGE AT WHICH A BATTERY IS CHARGED BY AN ALTERNATOR

[75] Inventors: Jean-Marie Pierret, Paris; Didier Canitrot, Saint-Maur Des Fosses, both of France

[73] Assignee: Valeo Equipements Electriques Moteur, Creteil, France

[21] Appl. No.: 832,015

[22] Filed: Feb. 6, 1992

[30] Foreign Application Priority Data

Feb. 7, 1991 [FR] France ............................ 91 01377

[51] Int. Cl.$^5$ ............................................. G05F 3/30
[52] U.S. Cl. ................................. 323/313; 323/907; 307/10.1; 307/296.1; 320/9
[58] Field of Search ............ 323/313, 314, 907; 307/296.1, 296.6, 296.7, 296.8, 10.1; 320/9

[56] References Cited

U.S. PATENT DOCUMENTS

| | | |
|---|---|---|
| 3,851,241 | 11/1974 | Wheatley, Jr. . |
| 4,636,710 | 1/1987 | Stanojevic . |
| 4,945,260 | 7/1990 | Naghshineh et al. ............ 307/296.6 |
| 5,001,414 | 3/1991 | Brambilla et al. .................. 323/313 |
| 5,053,640 | 10/1991 | Yum ................................. 307/296.6 |

FOREIGN PATENT DOCUMENTS 0189885 8/1986 European Pat. Off. .
WO9100635 1/1991 PCT Int'l Appl. .

OTHER PUBLICATIONS

IEE Trans. on Consumer Electronics, vol. CE-26, No. 3, Aug. 1980, pp. 211-222, New York, US; P. Menniti et al.: "A New Voltage Regulator Protects the Automotive Electronics".

Primary Examiner—Emanuel T. Voeltz

[57] ABSTRACT

A circuit for generating a reference voltage that varies as a function of temperature, in particular for regulating the voltage at which a battery is charged by an alternator, wherein the circuit comprises: a source of a voltage that is fixed regardless of temperature; two bipolar transistors whose bases are interconnected and whose base-emitter junctions have different temperature behaviors, with constant currents flowing through each of them; a first resistor connected between the emitters of the two transistors, with the voltage across the terminals thereof being representative of the temperature to which the two transistors are exposed; and a second resistor connected between the fixed voltage source and an output for the reference voltage, and through which a current may flow, at least over a predetermined range of temperatures, which current is equal to the additional current induced by an increase in the voltage across the terminals of said first resistor relative to a voltage which corresponds to a critical temperature.

9 Claims, 4 Drawing Sheets

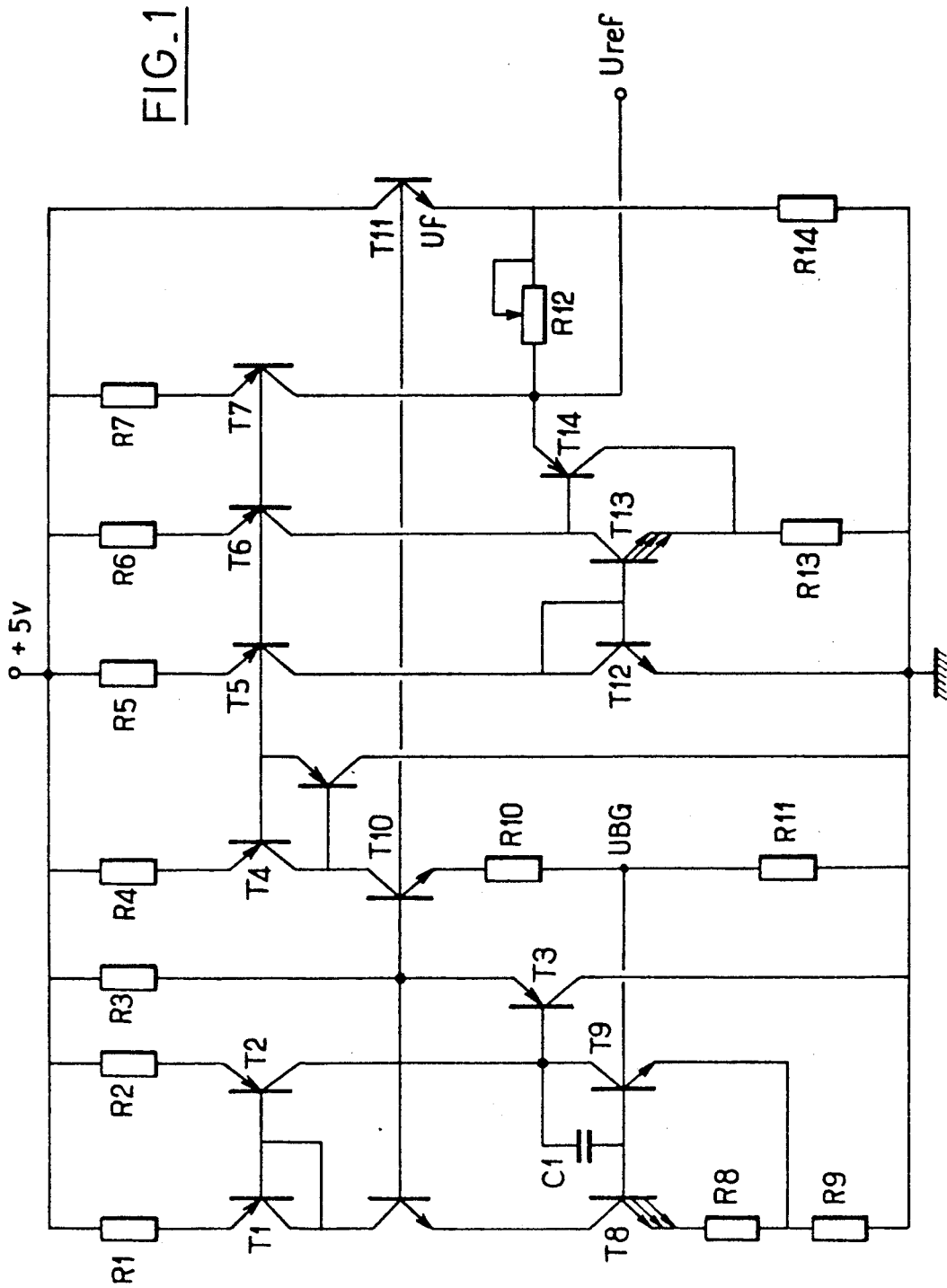
FIG._1

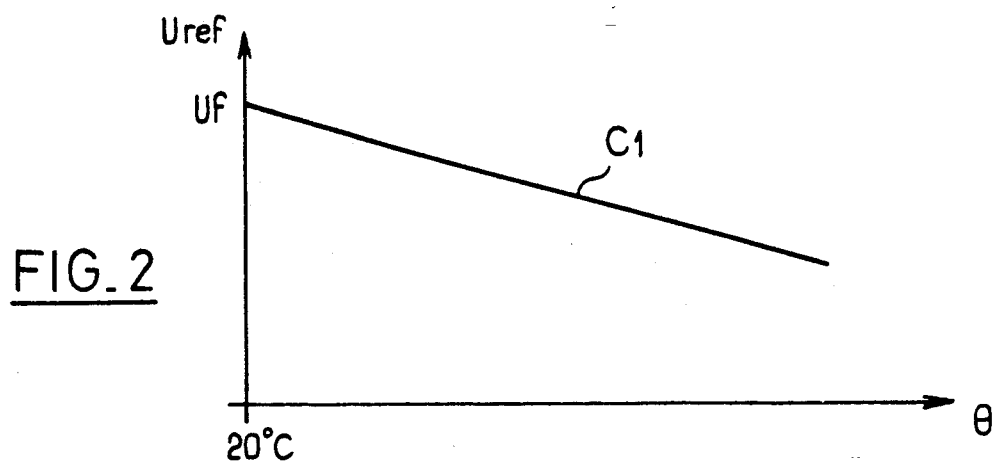
FIG_2
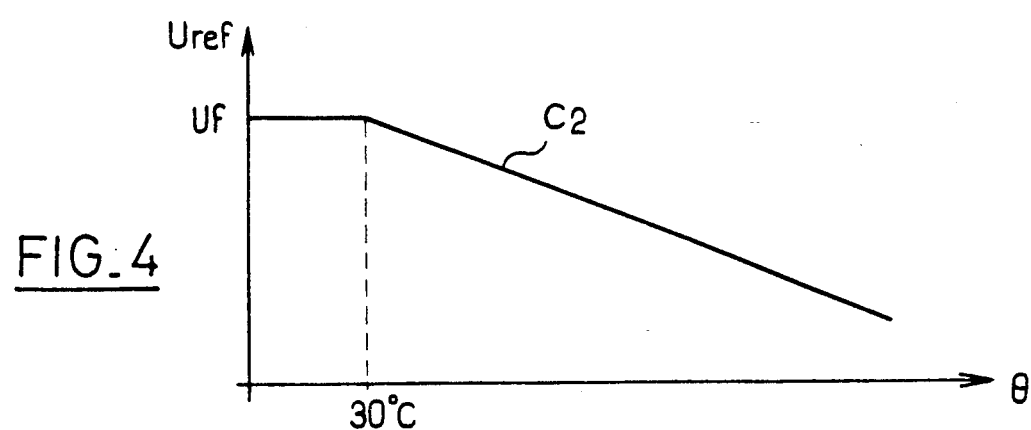
FIG_4
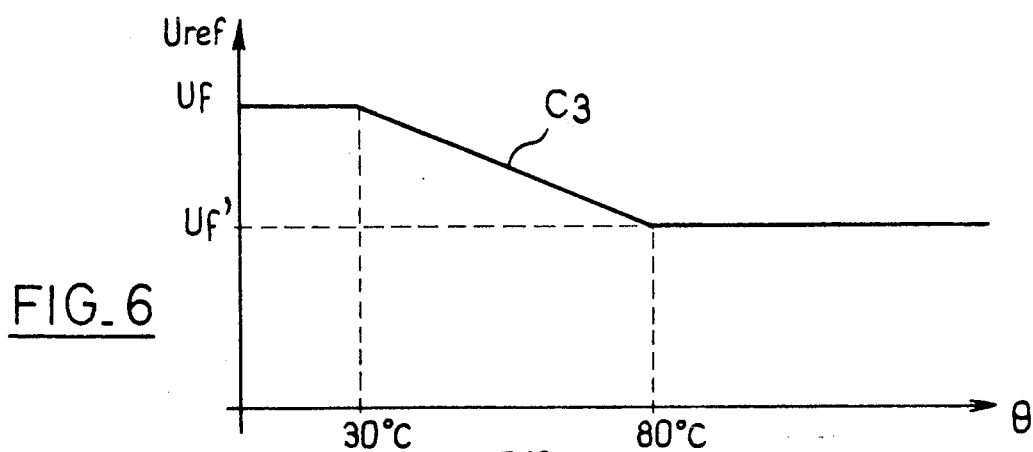
FIG_6
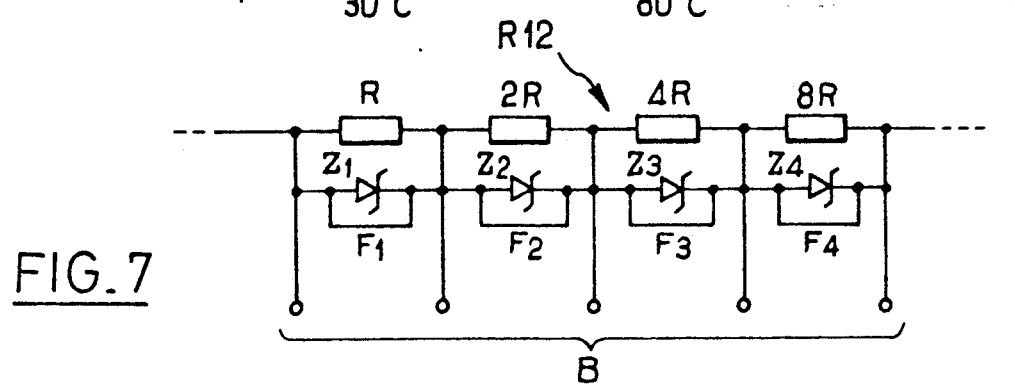
FIG_7

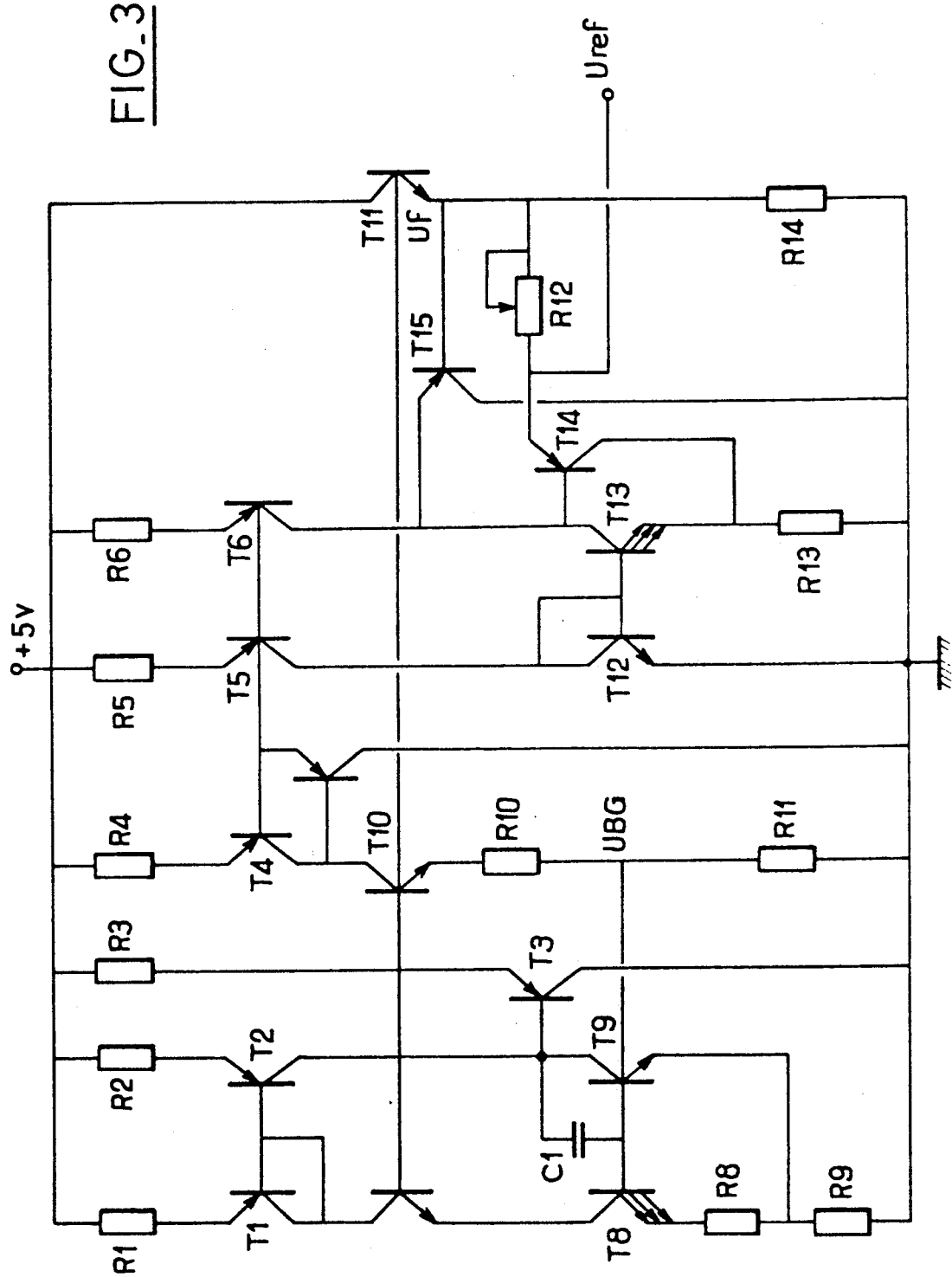
FIG_3

CIRCUIT FOR GENERATING A REFERENCE VOLTAGE THAT VARIES AS A FUNCTION OF TEMPERATURE, IN PARTICULAR FOR REGULATING THE VOLTAGE AT WHICH A BATTERY IS CHARGED BY AN ALTERNATOR

The present invention relates in general to regulator circuits for alternators in motor vehicles or the like.

BACKGROUND OF THE INVENTION

It is known that the charging voltage of a vehicle battery can be regulated by controlling the excitation current of the alternator as a function of the result of a comparison between the voltage actually output by the alternator and a given reference voltage.

The reference voltage may be constant, but it turns out to be desirable under certain conditions to vary said voltage as a function of temperature.

In a conventional type of circuit for obtaining a reference voltage that varies as a linear and decreasing function of temperature, the slope and the intercept of the straight line representing the value of the reference voltage as a function of temperature require at least three specific resistance values in the circuit to be determined by calculation or by experiment.

It will thus be understood that such a circuit is poorly adapted to being integrated in a silicon chip, particularly if it is desirable for the circuit to be capable of being parameterized for different characteristic curves of reference voltage as a function of temperature. If N represents the number of possible curves, it then becomes necessary to provide 3xN resistances and associated with fuses that can be actuated externally. The size and the cost of the integrated circuit are thus increased undesirably.

The present invention seeks mainly to mitigate this drawback of the prior art and to provide a circuit for generating a variable reference voltage in which one characteristic curve can be selected from a plurality thereof in a manner which is extremely simple and cheap.

Another object of the invention is to reduce the number of resistances and fuses that are required for obtaining a given number of possible slopes.

SUMMARY OF THE INVENTION

To this end, the present invention provides a circuit for generating a reference voltage that varies as a function of temperature, in particular for regulating the voltage at which a battery is charged by an alternator, wherein the circuit comprises:

a source of a voltage that is fixed regardless of temperature;

two bipolar transistors whose bases are interconnected and whose base-emitter junctions have different temperature behaviors, with constant currents flowing through each of them;

a first resistor connected between the emitters of the two transistors, with the voltage across the terminals thereof being representative of the temperature to which the two transistors are exposed; and a second resistor connected between the fixed voltage source and an output for the reference voltage, and through which a current may flow, at least over a predetermined range of temperatures, which current is equal to the additional current induced by an increase in the voltage across the terminals of said first resistor relative to a voltage which corresponds to a critical temperature.

The slope of the straight line giving the value of the reference voltage as a function of temperature is thus determined solely by the resistance of the second resistor.

BRIEF DESCRIPTION OF THE DRAWINGS

Embodiments of the invention are described by way of example with reference to the accompanying drawings, in which:

FIG. 1 is a circuit diagram for a first embodiment of the invention;

FIG. 2 is a graph showing the characteristic curve of the reference voltage generated as a function of temperature by the circuit of FIG. 1;

FIG. 3 is the circuit diagram of a second embodiment of the invention;

FIG. 4 is a graph showing the characteristic curve of the reference voltage generated as a function of temperature by the circuit of FIG. 3;

FIG. 6 is a graph showing the characteristic curve of the reference voltage generated as a function of temperature by the circuit of FIG. 5; and FIG. 7 shows one possible practical implementation of a portion of the circuits of FIGS. 1, 3, and 5.

DETAILED DESCRIPTION

Figure 5:
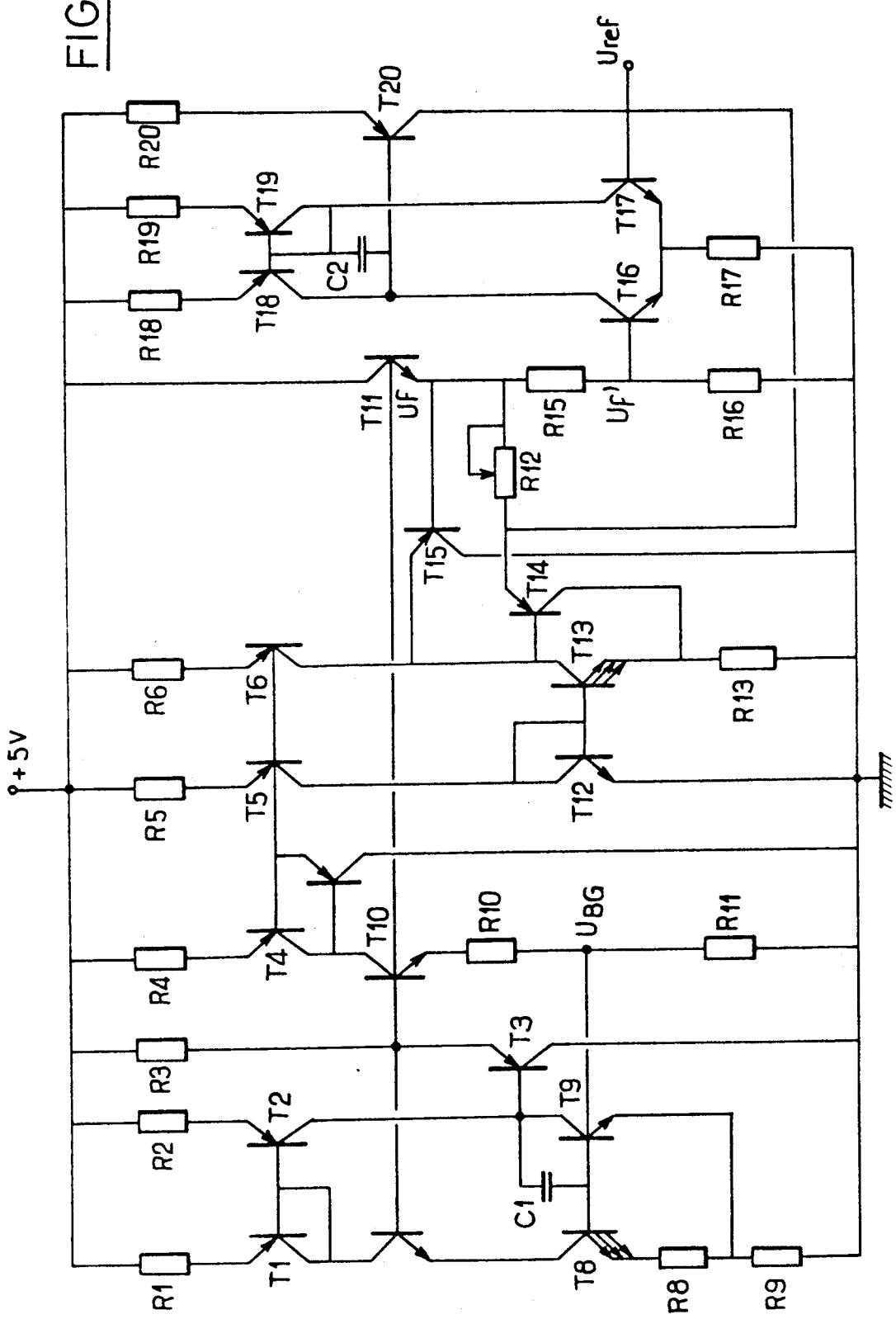
FIG. 5 is the circuit diagram of a third embodiment of the invention.

As a preliminary point, it may be observed that items or portions that are identical or similar from one figure to another are designated therein by the same reference symbols.

With reference initially to FIG. 1, a portion is shown of an integrated circuit for an alternator regulator, the portion constituting the generator of a reference voltage that varies as a function of temperature in compliance with a predetermined characteristic.

PNP transistors T1 to T7 and associated resistors R1 to R7 constitute current sources.

A fixed voltage generator is organized around T3, T8, T9, C4, R8, and R9, i.e. a generator that generates a voltage value that is completely independent of temperature. In the present example, the voltage generator is a "band gap" generator on the bases of T8 and T9. This voltage is written UBG and has a value of 1.26 volts, for example.

This voltage is multiplied by a coefficient determined by resistors R10 and R11 and is reproduced via a pair of transistors T10 and T11 on the emitter of T11. The voltage obtained on said emitter is written Uf.

The emitter of T11 is connected to the first terminal of a resistor R12 whose second terminal is connected firstly to current generator T7, R7, and secondly to the emitter of a PNP transistor T14, and thirdly to an output terminal for the reference voltage Uref.

Two NPN transistors T12 and T13 receive respective identical currents via their collectors as delivered by R5, T5 and R6, T6, respectively. The bases of T12 and T13 are connected to the collector of T12. The emitter of T12 is connected directly to ground, while the emitter of T13 is connected to ground via a resistor R13. The base of T14 is connected to the collector of T13, and the collector of T14 is connected to the emitter of T13.

It may be observed that T12 is a transistor having a single emitter, whereas T13 includes a plurality of emitters, e.g. ten emitters.

The above-described circuit operates as follows.

It should firstly be specified that the resistance of R13 is selected so that at a pivot temperature, e.g. selected to be equal to 20° C., the voltage across the terminals of R13 which is equal to the difference between the emitter-base voltage of T12 and the emitter-base voltage of T13 corresponds to a current through R13 which is exactly equal to the sum of the currents provided by the current generators R6, T6 and R7, T7.

It will be understood that the above-mentioned difference is positive given that the current density through T13 is less than that through T12 because of the larger number of emitters, and as a result the emitter-base voltage of T13 is smaller.

As temperature increases relative to the above-mentioned pivot, the emitter-base voltage falls more quickly in T13 than in T12. As a result the voltage across the terminals of R13 increases. Consequently, additional current is required through R13 compared with the currents delivered by the generators R6, T6 and R7, T7. This current can be taken only via R12 and T11. As a result the voltage Uref at the other terminal of R12 is equal to the fixed voltage delivered by T11 minus a voltage drop which is proportional to the current flowing through R12 (from right to left in the figure).

Naturally, the above reasoning given for the case where temperature increases can be transposed to the case where temperature decreases below 20° C. More precisely, a drop in temperature causes a proportional increase in the emitter-base voltages of T12 and T13, but with the variation in T13 being the greater. The voltage across the terminals of R13 therefore drops, and a portion of the current from R7, T7 that previously passed through R13 via T14 is diverted through R12 and R14 to ground. As a result Uref is equal to the fixed voltage at the emitter of T11 plus the voltage generated in this way across the terminals of R12.

It should be observed that the linearity of the variation in the emitter-base voltages as a function of temperature translates into linearity in the increase of the current through R12 (in one direction or the other) with any increase in the temperature difference (up or down) relative to the pivot value of 20° C. The characteristic curve for the value of Uref as a function of temperature $\theta$ is thus a straight line C1 as shown in FIG. 2.

It will be understood that the slope of the line C1 can be set simply by choosing an appropriate resistance for R12. Means are described below for enabling the resistance of R12 to be selected from a large number of possible resistances in a manner that is particularly simple and cheap in the context of an embodiment on an integrated circuit chip.

It may also be observed that the resistance of R14 is selected to be approximately equal to the sum of the resistances of R10 and R11 so as to balance the respective junctions of T10 and T11, which condition is necessary to ensure that the value of Uf is properly copied between T10 and T11.

FIG. 3 shows a second embodiment of the invention. This circuit is essentially similar to the circuit of FIG. 1 and the description below relates only to the differences between them.

The purpose of the circuit in FIG. 3 is to obtain a characteristic in which Uref is constant below a relatively high fixed temperature, e.g. 30° C., and falls off linearly above 30° C. with any increase in temperature above said value.

Under such circumstances, the current generator R7, T7 is omitted. An additional PNP type transistor is provided with its base connected to the emitter of T11, its emitter connected to the current generator R6, T6, and its collector connected to ground.

In this case, the resistance of R13 is set so that at the critical temperature of 30° C., the current provided by the current generator R6, T6 is suitable on its own for generating a voltage across the terminals of R13 which is equal to the difference between the emitter-base voltage of T12 and the emitter-base voltage of T13.

When the temperature is below 30° C., the two emitter-base voltages increase linearly, but with greater amplitude in T13. The voltage across the terminals of R13 therefore drops and a portion of the current developed by R6, T6 is diverted so that it does not pass through R13. This diversion takes place via T15.

It will be understood that under such circumstances, and regardless of the magnitude of the temperature drop, the transistor T14 is switched off and no current flows through R12, such that for the entire range of temperatures below 30° C., the value of the voltage Uref remains substantially equal to the value of the fixed voltage Uf.

In contrast, when the temperature rises above 30° C., then the voltage across the terminals of R13 increases and current must be taken to be added to the current provided by R6, T6. Under such circumstances, this current can be taken only from circuit T11, R12, and T14, such that a current flows through R12 (from right to left in FIG. 3) which is proportional to the difference between the real temperature and the critical value of 30° C.

It will thus be understood that Uref falls off linearly with said temperature difference.

The corresponding characteristic curve C2 is shown in FIG. 4.

As in the case of FIG. 1, the slope of the straight line for values of $\theta > 30°$ C. can be adjusted to a desired value by varying R12.

FIG. 5 shows a main third embodiment of the present invention.

In this case, a characteristic curve is obtained for the reference voltage as a function of temperature such that:

for $\theta$ below a fixed value, e.g. 30° C., Uref is equal to a first predetermined constant value, namely Uf;

for $\theta$ lying in the range 30° C. and an upper value, e.g. 70° C. to 90° C. and in this example 80° C., Uref falls off linearly with an increasing value of temperature difference from 30° C.; and for $\theta$ greater than 80° C., Uref is again constant and equal to a value Uf' which is less than Uf.

The circuit of FIG. 5 includes all of the components of the circuit of FIG. 3, and they are not described again.

Its additional components are described below. The resistor R14 is replaced by R15 and R16 connected in series, with the sum of their resistances being approximately equal to the sum of R10 plus R11.

The base of an NPN transistor T16 is connected to the common point between R15 and R16. Its emitter is connected to ground via a resistor R17. The common point between R12 and T14 is connected firstly to the base of an NPN transistor T17 whose emitter is connected to the emitter of T16, and secondly to the output terminal for Uref. T16 and T17 are connected as a differential amplifier with their bases respectively receiving the voltage Uf'<Uf and the voltage taken from the terminal of R12 that is adjacent to T14.

R18, T18 and R19, T19 constitute current generators which apply the same currents to the collectors of T16 and T17. The collector of T18 is connected to the base of a PNP transistor T20 associated with an emitter resistor R20. The collector of T20 is connected to the output terminal for Uref to the base of T17 and to the common point between R12 and T14.

For temperature values of less than 80° C., this circuit operates in the same way as the circuit of FIG. 3, which operation is not described again. FIG. 6 thus has a curve C3 constituted by a straight line of zero slope below 30° C. and a straight line of given negative slope above 30° C. (and again the slope is fixed by the resistance of R12).

In contrast, as soon as the temperature reaches the second critical value, e.g. 80° C., operation is affected by the additional circuitry described above. More precisely, so long as Uref remains greater than Uf', then T16 is switched off and no current can flow via the base of T20. T20 is therefore off.

As soon as Uref becomes less than Uf' because of an increase in $\theta$, then T16 is switched on and also switches on the transistor T20. Transistor T20 passes a current which flows via T14 and through R13 to match the increase in voltage across its terminals.

As a result, above a value of Uref equal to Uf', any extra current required in R13 is delivered by the circuit R20, T20, T14. The current flowing through R12 therefore stabilizes and the value of the voltage Uref remains essentially constant.

FIG. 6 shows the shape of the curve obtained for Uref as a function of temperature, which shape is conventionally referred to as a "Z" curve.

Circuits have thus been described enabling a range of curves to be obtained for a reference voltage as a function of temperature. These curves are applicable as a function of conditions relating particularly to the location of the battery in the vehicle, and to the risks of the battery being exposed to varying temperatures that cause its internal resistance to vary, and also to the risks of the alternators themselves heating up, as occurs in particular when alternators of small size are used since they have limited ability to dump heat.

A practical embodiment of the resistor 12 for use in an integrated circuit chip is described below with reference to FIG. 7.

As mentioned above, it may be desirable to alter the slope at which Uref falls off as a function of temperature in any of the embodiments described above.

Under such circumstances, R12 is made up of a series connection of a plurality of resistors, and in the present example of four resistors R to 8R whose resistances form a geometrical progression with a unit ratio of two.

Four fuses, constituted by four pieces of metallization F1 to F4 superposed on four zener diodes Z1 to Z4 are connected in parallel with respective ones of the resistors. Five access terminals B enable currents to be injected into the zener diodes suitable for heating the diodes to temperatures at which the corresponding fuses F1 to F4 melt and go open circuit.

It will be understood that by acting appropriately on the zener diodes and on their associated fuses, the above solution makes it possible to fix R12 at any one of fifteen different resistance values respectively equal to R, 2R, 3R, ..., 14R, and 15R, thereby obtaining fifteen different slopes.

Such a solution is particularly simple and cheap and it serves in general using N resistors to obtain $2^N-1$ different possible resistances.

Naturally, the present invention is not limited in any way to the embodiments described above and shown in the drawings, and the person skilled in the art will be capable of making variants and modifications thereto that come within the scope of the invention.

We claim:

1. A circuit for generating a reference voltage that varies with the temperature at least in a selected temperature range, in particular for regulating the voltage at which a battery is charged by an alternator, wherein said circuit comprises:

a source of voltage that is fixed regardless of temperature;

a pair of first and second bipolar transistors provided in an integrated circuit, the bases of which are interconnected and the number of emitters of which are different from each other so as to have different temperature behaviors of the base-emitter junctions, a pair of current sources for applying constant currents to said pair of bipolar transistors, respectively, a first resistor connected between the emitters of said pair of bipolar transistors, so that the current through said first resistor varies as a function of the temperature to which said pair of bipolar transistors are exposed, a second resistor connected between said source of fixed voltage and an output for said reference voltage, and through which a shifting current may flow, a third transistor connected between said output for said reference voltage and one terminal of said first resistor, and through which said shifting current may flow, said shifting current being equal to the current required in addition to the current supplied by one of said current sources when the current through said first resistor increases due to an increase of the temperature to which said pair of bipolar transistors are exposed above a selected critical temperature, whereby said reference voltage is shifted from said fixed voltage by a value equal to the voltage drop caused by said shifting current in said second resistor and varies as a function of said temperature.

2. A circuit according to claim 1, further comprising a third current source for applying to the connection between said second resistor and said third transistor a third constant current, whereby a decrease of the current through said first resistor due to a decrease of the temperature to which said pair of bipolar transistors are exposed beneath said critical temperature causes a leak of part of the current from said third voltage source through said second resistor in the form of a reverse shifting current, whereby under said critical temperature, said reference voltage is shifted from said fixed voltage in the reverse direction by a value equal to the voltage drop caused by said reverse shifting current in said second resistor.

3. A circuit according to claim 1, further comprising a fourth transistor defining a leak path for one of said pair of current sources, whereby a decrease of the current through said first resistor due to a decrease of the temperature beneath said critical temperature causes a leak of part of the current supplied by said one current source through said fourth transistor without traversing said second resistor, whereby under said critical temperature, no shifting current is generated in said second resistor and the reference voltage remains equal to said fixed voltage.

4. A circuit according to claim 3, further comprising means for limiting the maximum value of said shifting current flowing through said second resistor to a given value.

5. A circuit according to claim 4, wherein said limiting means comprise a second pair of fifth and sixth bipolar transistors connected as a differential amplifier, the base of one of said second pair of transistors being connected to said output for the reference voltage and the base of the other of said second pair of transistors being connected to said source of fixed voltage via a divider bridge, and a seventh transistor controlled by the output of said differential amplifier and connected to the connection between said second resistor and said third transistor so as to become conductive and to constitute a source of compensating current when the temperature has reached a second critical temperature and said reference voltage has decreased under a fraction of said fixed voltage as defined by said divider bridge, whereby, above said second critical temperature, no shifting current is generated in said second resistor and the reference voltage remains equal to said fraction of the fixed voltage.

6. A circuit according to claim 1, further including value fixing means for fixing said second resistor at a value selected from a plurality of values, thereby adjusting the slope at which said reference voltage falls off in said selected temperature range.

7. A circuit according to claim 6, wherein said value fixing means comprise a set of components capable of being selectively interrupted and each connected in parallel with a corresponding one of a plurality of resistors connected in series.

8. A circuit according to claim 7, the values of said resistor connected in series constitute a geometrical progression with a unit ratio of two.

9. A regular for regulating the voltage at which a battery is charged by an alternator, comprising means for comparing a voltage output by said alternator with a reference voltage and for controlling accordingly an excitation current of said alternator, and a circuit for generating said reference voltage so that it varies with the temperature at least in a selected temperature range, wherein said circuit for generating said reference voltage comprises:

a source of voltage that is fixed regardless of temperature;

a pair of first and second bipolar transistors provided in an integrated circuit, the bases of which are interconnected and the number of emitters of which are different from each other so as to have different temperature behaviors of the base-emitter junctions, a pair of current sources for applying constant currents to said pair of bipolar transistors, respectively, a first resistor connected between the emitters of said pair of bipolar transistors, so that the current through said first resistor varies as a function of the temperature to which said pair of bipolar transistors are exposed, a second resistor connected between said source of fixed voltage and an output for said reference voltage, and through which a shifting current may flow, a third transistor connected between said output for said reference voltage and one terminal of said first resistor, and through which said shifting current may flow, said shifting current being equal to the current required in addition to the current supplied by one of said current sources when the current through said first resistor increases due to an increase of the temperature to which said pair of bipolar transistors are exposed above a selected critical temperature, whereby said reference voltage is shifted from said fixed voltage by a value equal to the voltage drop caused by said shifting current in said second resistor and varies as a function of said temperature.

* * * * *